United States Patent
Park et al.

(10) Patent No.: US 10,812,124 B2
(45) Date of Patent: Oct. 20, 2020

(54) METHOD FOR OPERATING ANTENNA AND ELECTRONIC DEVICE IMPLEMENTING THE SAME

(71) Applicant: Samsung Electronics Co., Ltd., Suwon-si, Gyeonggi-do (KR)

(72) Inventors: Jongkui Park, Suwon-si (KR); Yongtae Kim, Hwaseong-si (KR); Sunghee Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 694 days.

(21) Appl. No.: 14/799,035

(22) Filed: Jul. 14, 2015

(65) Prior Publication Data

US 2016/0013548 A1 Jan. 14, 2016

(30) Foreign Application Priority Data

Jul. 14, 2014 (KR) ........................ 10-2014-0088664

(51) Int. Cl.
| | | |
|---|---|---|
| *H04B 1/38* | (2015.01) | |
| *H04B 1/3816* | (2015.01) | |
| *H01Q 13/10* | (2006.01) | |
| *H01Q 5/371* | (2015.01) | |
| *H01Q 9/40* | (2006.01) | |
| *H01Q 21/28* | (2006.01) | |
| *H01Q 1/24* | (2006.01) | |

(52) U.S. Cl.
CPC .......... *H04B 1/3816* (2013.01); *H01Q 5/371* (2015.01); *H01Q 9/40* (2013.01); *H01Q 13/10* (2013.01); *H01Q 21/28* (2013.01); *H01Q 1/243* (2013.01)

(58) Field of Classification Search
None
See application file for complete search history.

(56) References Cited

U.S. PATENT DOCUMENTS

| | | |
|---|---|---|
| 6,961,022 B1 | 11/2005 | Tay et al. |
| 8,816,913 B2 | 8/2014 | Rhyu et al. |
| 8,963,783 B2 | 2/2015 | Vin et al. |
| 2006/0256024 A1* | 11/2006 | Collinson ................ H01Q 5/00 343/770 |

(Continued)

FOREIGN PATENT DOCUMENTS

| | | |
|---|---|---|
| JP | 2006-279160 A | 10/2006 |
| JP | 2013-016947 A | 1/2013 |

(Continued)

*Primary Examiner* — Jinsong Hu
*Assistant Examiner* — Alexander J Yi
(74) *Attorney, Agent, or Firm* — Jefferson IP Law, LLP

(57) ABSTRACT

A method for operating an antenna and an electronic device implementing the method are provided. The electronic device includes a power feed module including a first power feed terminal and a second power feed terminal, a current supply module configured to select one of the first power feed terminal and the second power feed terminal and to supply an electric current to the selected power feed terminal, and an antenna module including a first antenna and a second antenna. The electronic device further includes a connection module configured to connect the power feed module and the antenna module, and a control module configured to control the current supply module. The connection module includes a plurality of wirings.

18 Claims, 11 Drawing Sheets

(56) References Cited

U.S. PATENT DOCUMENTS

| | | |
|---|---|---|
| 2011/0261727 A1* | 10/2011 | Han ............... H04B 1/006 |
| | | 370/277 |
| 2012/0009983 A1 | 1/2012 | Mow et al. |
| 2012/0098716 A1* | 4/2012 | Dai ............... H01Q 1/1271 |
| | | 343/713 |
| 2012/0105286 A1 | 5/2012 | Rhyu et al. |
| 2012/0154247 A1 | 6/2012 | Braun et al. |
| 2012/0329407 A1* | 12/2012 | Rousu ............ H01Q 3/2605 |
| | | 455/90.2 |
| 2013/0050026 A1 | 2/2013 | Vin et al. |
| 2013/0069836 A1* | 3/2013 | Bungo ............ H01Q 1/243 |
| | | 343/724 |
| 2014/0159982 A1 | 6/2014 | De Luis et al. |
| 2015/0063174 A1 | 3/2015 | Han |
| 2015/0130670 A1 | 5/2015 | Vin et al. |

FOREIGN PATENT DOCUMENTS

| | | |
|---|---|---|
| KR | 10-2011-0025365 A | 3/2011 |
| KR | 10-2012-0045956 A | 5/2012 |
| KR | 1218702 B1 * | 1/2013 |
| KR | 10-2013-0020981 A | 3/2013 |
| KR | 10-2013-0106213 A | 9/2013 |
| WO | 01/29927 A1 | 4/2001 |

\* cited by examiner

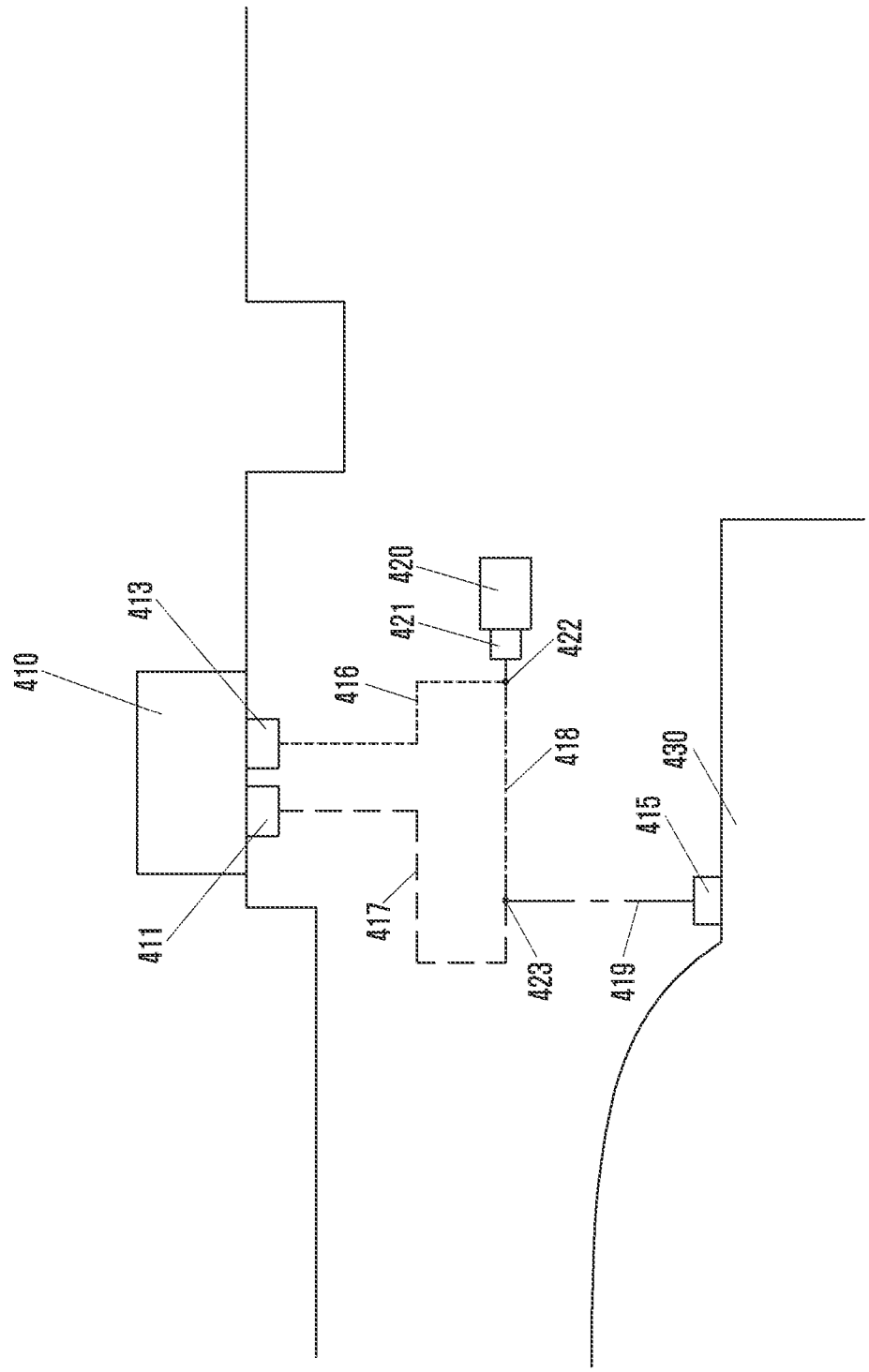

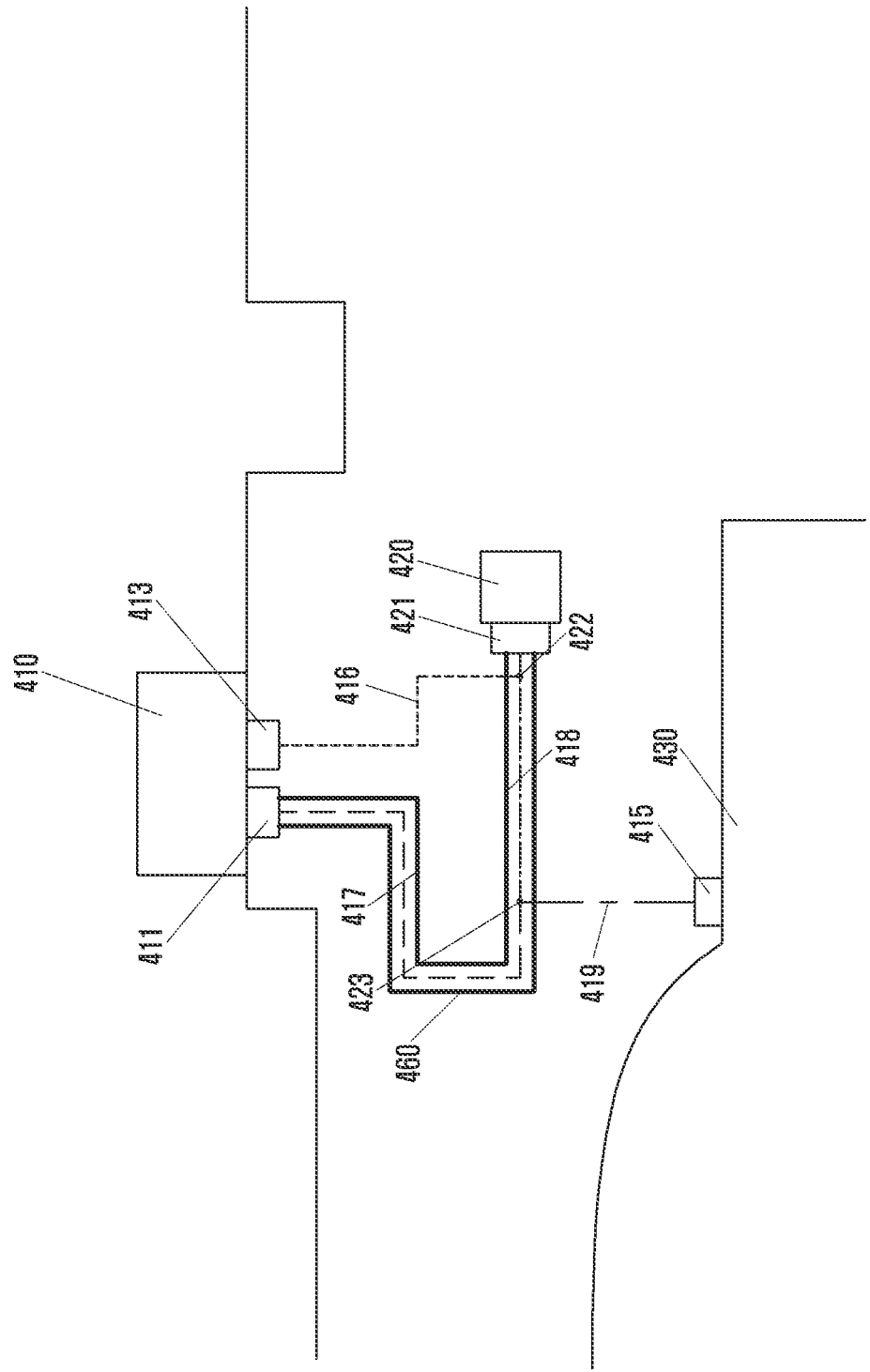

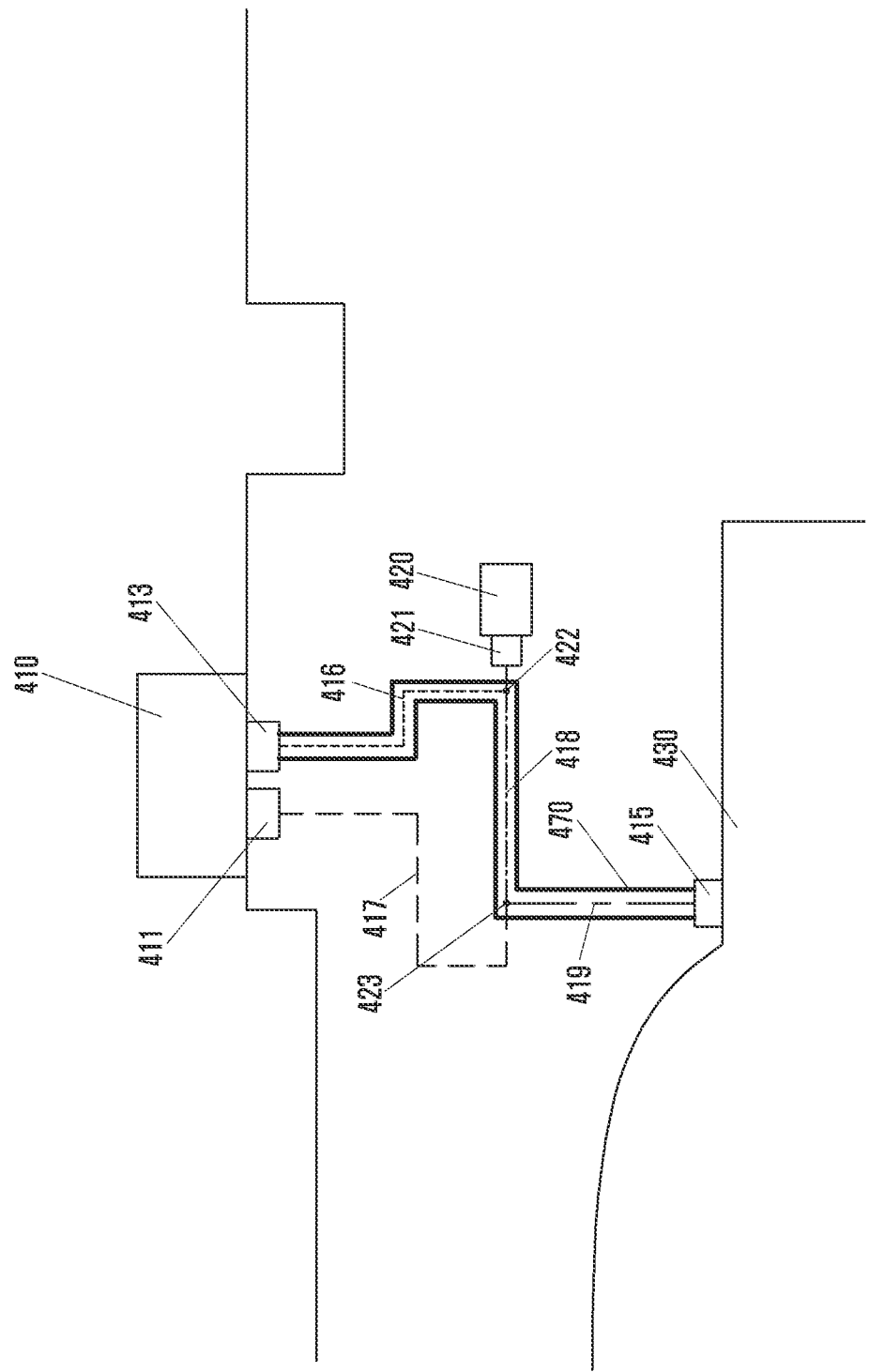

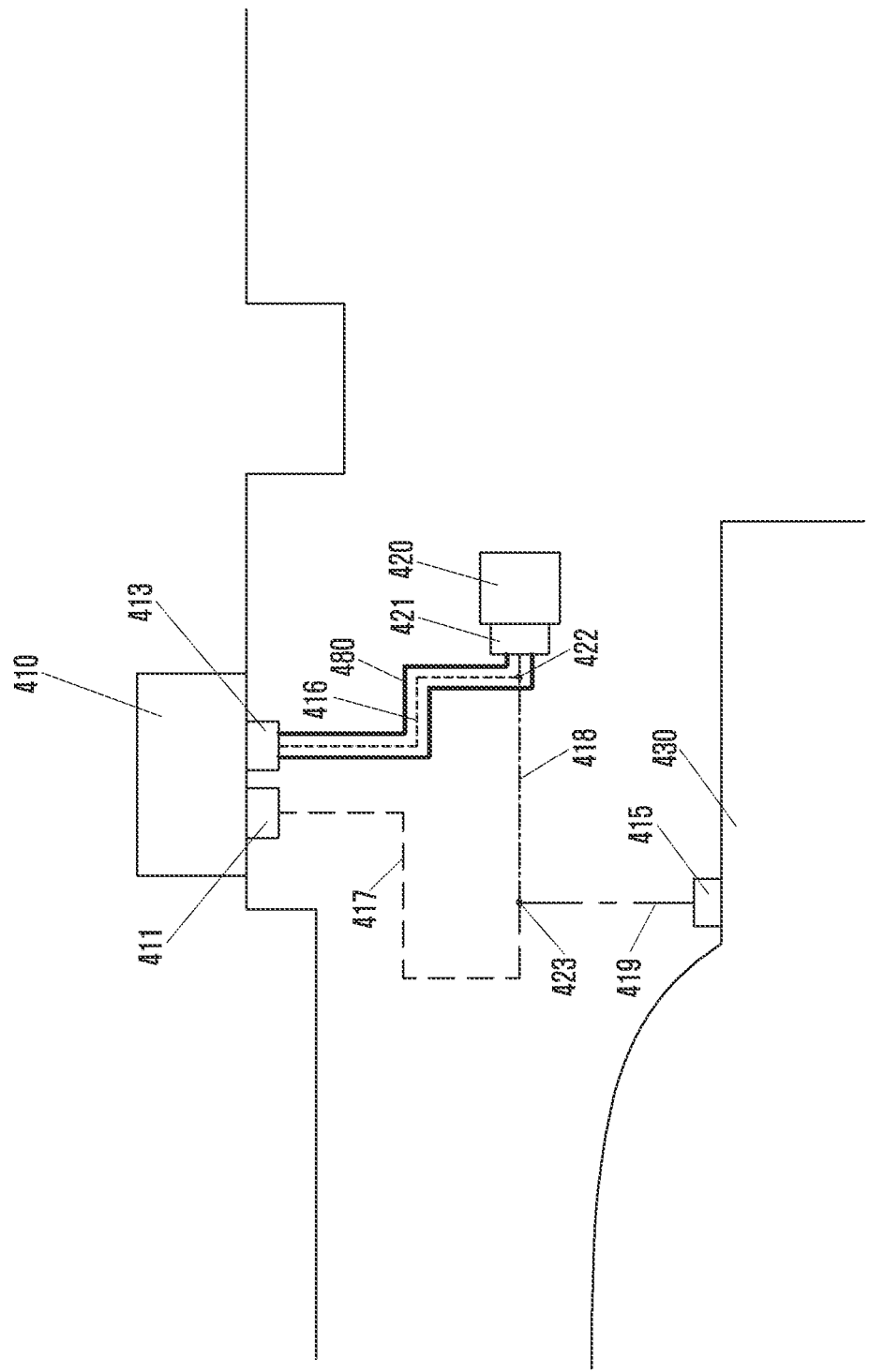

METHOD FOR OPERATING ANTENNA AND ELECTRONIC DEVICE IMPLEMENTING THE SAME

CROSS-REFERENCE TO RELATED APPLICATION(S)

This application claims the benefit under 35 U.S.C. § 119(a) of a Korean patent application filed on Jul. 14, 2014 in the Korean Intellectual Property Office and assigned Serial number 10-2014-0088664, the entire disclosure of which is hereby incorporated by reference.

TECHNICAL FIELD

The present disclosure relates to a method for operating an antenna and an electronic device implementing the method. More particularly, the present disclosure relates to a method for operating an antenna so as to perform a communication using a frequency band offered by other communication operator as well as a specific frequency band even in a limited space for an antenna.

BACKGROUND

An electronic device capable of a wireless communication can perform a communication using a frequency band offered by a communication operator. For example, the electronic device ascertains the communication operator through a universal subscriber identity module (USIM) card of the operator and performs a communication using a specific frequency band of the ascertained operator. Normally each communication operator provides a communication service to users based on a specific frequency band allocated thereto. Meanwhile, with advancement of communication technologies, users can use various communication services. More particularly, as various types of contents (e.g., video, music, game, and the like) that require transmission of a large amount of data are now widely used, users often need a faster and more reliable data communication service. Therefore, in order to reduce traffic congestion and increase a communication speed, communication operators are using technique to combine some frequency bands.

One technique to use two or more frequency bands is based on a multi-carrier. This technique is to identify a relatively faster frequency band from among two or more frequency bands offered to the electronic device and to perform a communication using the identified frequency band. For example, if a communication speed of a specific frequency band used mainly for providing a communication service is reduced, a communication operator may provide the communication service through any other frequency band having a higher speed than that of the current frequency band in use. This technique can offer a communication service to a large number of devices without varying a speed of the communication service.

Another technique to use two or more frequency bands is based on carrier aggregation (CA). This technique can enhance a communication speed up to twice the communication speed by using two or more frequency bands. For example, if the electronic device allows a communication at a speed of 75 Mbps through a single frequency band, a communication operator can enhance a communication speed up to 150 Mbps by aggregating frequency bands. Namely, CA may offer a faster communication service in comparison with a communication using a single frequency band.

As a USIM lock is released, the electronic device may be designed to use a frequency band offered by any other communication operator as well as to use a frequency band offered by a specific communication operator. In order to allow a change in a communication frequency band, the electronic device may add physically an antenna and/or a pattern thereof or modify the characteristics of ground. In a case of adding physically an antenna, the electronic device may have an increased size due to the addition of the antenna. In this case, an antenna to be added may have a greater size when a frequency band used in the electronic device is low. Similarly, in a case of adding an antenna pattern, the electronic device may have an increased size for embedding therein the added pattern. Meanwhile, in a case of modifying the ground characteristics, the characteristics (e.g., a resonant frequency) of the antenna used in the electronic device may be varied. Namely, not only a resonant frequency of a specific frequency band is changed, but also any other resonant frequency used in the electronic device may be changed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for operating an antenna so as to perform a communication using a frequency band offered by other communication operator as well as a specific frequency band even in a limited space for an antenna. Additionally, the present disclosure provides an electronic device that implements the aforesaid method.

In accordance with an aspect of the present disclosure, an electronic device is provided. The electronic device includes a power feed module including a first power feed terminal and a second power feed terminal, a current supply module configured to select one of the first power feed terminal and the second power feed terminal and to supply an electric current to the selected power feed terminal, an antenna module including a first antenna and a second antenna, a connection module configured to connect the power feed module and the antenna module, and a control module configured to control the current supply module. The connection module includes a plurality of wirings. The plurality of wirings are disposed such that a first path of the current from the first power feed terminal to the first antenna and a second path of the current from the second power feed terminal to the first antenna have substantially the same length, especially have the same length within a given margin of error. In addition, the plurality of wirings are disposed such that a third path of the current from the first power feed terminal to the second antenna and a fourth path of the current from the second power feed terminal to the second antenna have different lengths.

In accordance with another aspect of the present disclosure, a method for operating an antenna in an electronic device is provided. The method includes controlling a current supply module to supply an electric current to one of a first power feed terminal and a second power feed terminal. In the method, an antenna module includes a first antenna and a second antenna, and a connection module connects the current supply module and the antenna module and includes a plurality of wirings. The plurality of wirings are disposed such that a first path of the current from the first power feed terminal to the first antenna and a second path of the current from the second power feed terminal to the first antenna have substantially the same length, especially have the same length within a given margin of error. In addition, the plurality of wirings are disposed such that a third path of the current from the first power feed terminal to the second antenna and a fourth path of the current from the second power feed terminal to the second antenna have different lengths.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, 4C, 4D, and 4E are schematic diagrams illustrating different signal paths depending on frequency bands according to various embodiments of the present disclosure.

Throughout the drawings, it should be noted that like reference numbers are used to depict the same or similar elements, features, and structures.

DETAILED DESCRIPTION

Figure 1:
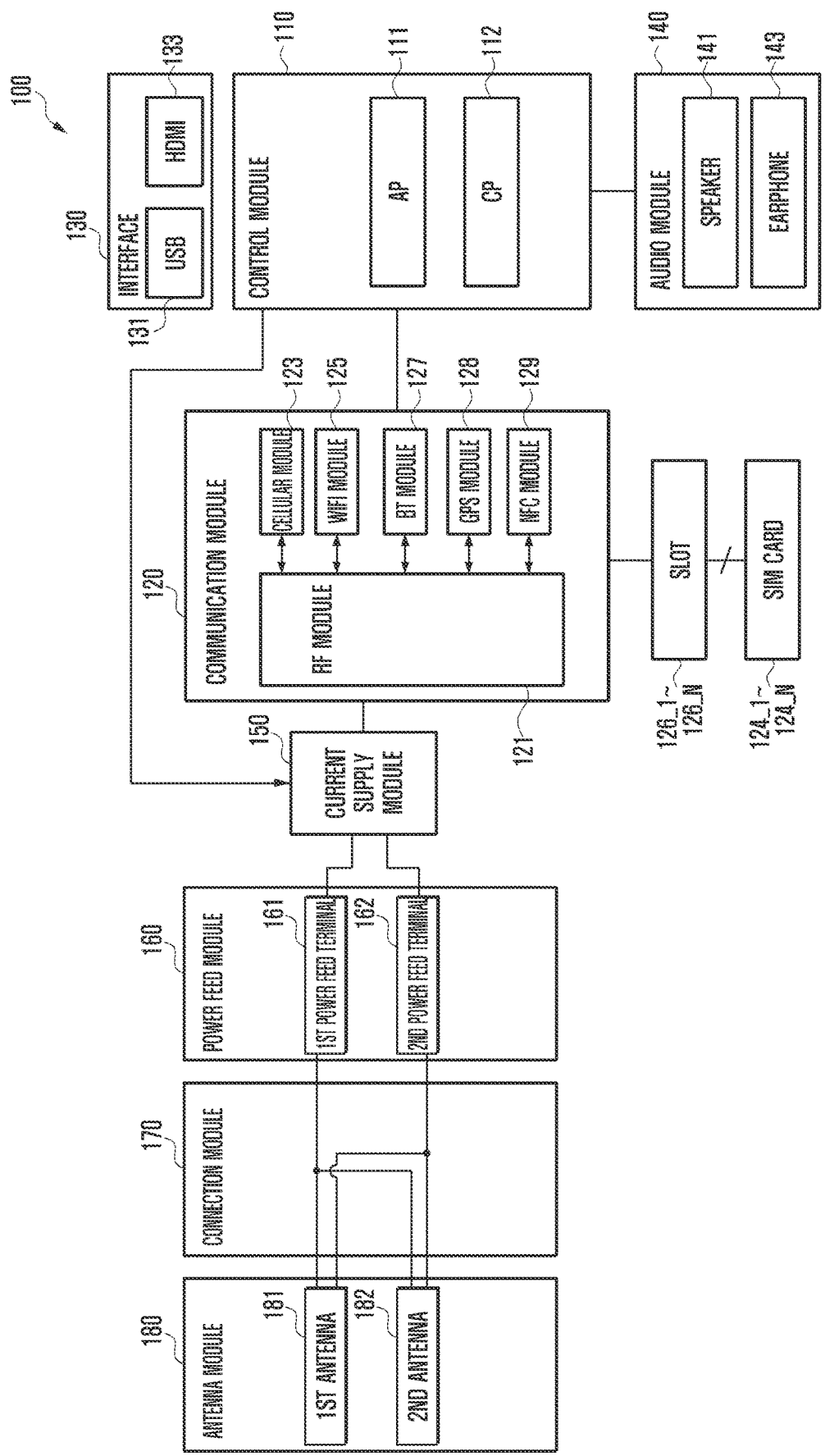
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be understood that the expressions "comprises" and "may comprise" is used to specify presence of disclosed function, operation, component, and the like, but do not preclude the presence of one or more functions, operations, components, and the like. It will be further understood that the terms "comprises" and/or "has" when used in this specification, specify the presence of stated feature, number, operation, component, element, or a combination thereof but do not preclude the presence or addition of one or more other features, numbers, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms, such as "first," "second," and the like, are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include a smartphone, a table Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer 3 (MP3) player, a mobile medical appliance, a camera, a wearable device (e.g., a head-mounted device (HMD), such as electronic glasses, an electronic clothing, an electronic bracelet, an electronic necklace, an electronic appcessory, an electronic tattoo, a smartwatch, and the like.

According to an embodiment of the present disclosure, the electronic device may be one of smart home appliances having operation support function. Examples of the smart electronic appliance as an electronic device may include a television, a Digital Video Disc (DVD) player, an audio player, a refrigerator, an air-conditioner, a vacuum cleaner, an electronic oven, a microwave oven, a laundry machine, an air cleaner, a set-to box, a TV box (e.g., Samsung HomeSync™, apple TV™, and google TV™), a game console, an electronic dictionary, an electronic key, a camcorder, an electronic frame, and the like.

According to an embodiment of the present disclosure, examples of the electronic device may include a medical device (e.g., Magnetic Resonance Angiography (MRA), Magnetic Resonance Imaging (MRI), Computed Tomography (CT)), a Navigation device, a Global Positioning System (GPS) receiver, an Event Data Recorder (EDR), a Flight Data Recorder (FDR), a car infotainment device, a maritime electronic device (e.g., a maritime navigation device and a gyro compass), an aviation electronic device (avionics), a security device, a vehicle head unit, an industrial or a home robot, an Automatic Teller's Machine (ATM) of financial institution, a Point Of Sales (POS), and the like.

According to an embodiment of the present disclosure, examples of the electronic device may include a furniture and a building/structure having a communication function, an electronic board, an electronic signature receiving device, a projector, and a metering device (e.g., water, electric, gas, and electric wave metering devices). According to various embodiments of the present disclosure, the electronic device may be any combination of the aforementioned devices. According to various embodiments of the present disclosure, the electronic device may be a flexible device. It is obvious to those skilled in the art that the electronic device is not limited to the aforementioned devices.

An electronic device according to various embodiments is described below with reference to the drawings. In the following description, the "user" may refer to a person utilizing an electronic device or to an appliance utilizing an electronic device (e.g., an artificial intelligence appliance).

FIG. 1 is a block diagram illustrating an electronic device according to an embodiment of the present disclosure.

Referring to FIG. 1, an electronic device 100 may include, for example, a control module 110, a communication module 120, an interface 130, an audio module 140, a current supply module 150, a power feed module 160, a connection module 170, and an antenna module 180.

According to an embodiment of this disclosure, the control module 110 may include at least one application processor (AP) 111 and a communication processor (CP) 112. The AP 111 may control multiple hardware or software elements connected thereto by executing an operating system (OS) or an application program, and also perform processing and arithmetic operations on various data including multimedia data. The AP 111 may be implemented using, for example, a system on chip (SoC). According to an embodiment of the present disclosure, the AP 111 may further include a graphical processing unit (GPU) (not shown). Meanwhile, the CP 112 may perform a function to manage a data link and convert a communication protocol in a communication with any other electronic device connected to the electronic device 100 through a network. The CP 112 may also be implemented using an SoC.

In an embodiment of the present disclosure, the control module 110 may identify subscriber identity module (SIM) cards 124_1~124_N connected to slots 126_1~126_N and perform a communication through the communication module 120. Additionally, the control module 110 may identify a frequency band, based on the SIM cards 124_1~124_N, and select a signal path according to the identified frequency band by controlling the current supply module 150.

According to an embodiment of this disclosure, the communication module 120 may perform transmission and reception of data in a communication with any other electronic device connected to the electronic device 100 through the network. In an embodiment of the present disclosure, the communication module 120 may include therein a radio frequency (RF) module 121, a cellular module 123, a Wireless Fidelity (WiFi) module 125, a Bluetooth (BT) module 127, a GPS module 128, and a near field communication (NFC) module 129.

According to an embodiment of the present disclosure, the cellular module 123 may provide a voice call, a video call, a message service, or an Internet service through a suitable communication network (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like). In addition, using a subscriber identity module (e.g., the SIM card 124), the cellular module 123 may perform identification and authentication of the electronic device in the communication network. According to an embodiment of the present disclosure, the cellular module 123 may perform at least part of functions offered by the AP 111. For example, the cellular module 123 may perform at least part of a multimedia control function.

According to an embodiment of the present disclosure, the cellular module 123 may include a CP. The cellular module 123 may also be implemented using an SoC. Although not shown, the cellular module 123 may further include a memory or power management module, for example.

According to an embodiment of the present disclosure, the AP 111 or the cellular module 123 (e.g., the CP) may load a command or data, received from at least one of a nonvolatile memory or any other element connected thereto, to a volatile memory and process the data. In addition, the AP 111 or the cellular module 123 may store, in a nonvolatile memory, data received from at least one of other elements or created by at least one of other elements.

Each of the WiFi module 125, the BT module 127, the GPS module 128, and the NFC module 129 may include therein a processor for processing data received or to be transmitted therethrough. Although in FIG. 1 each of the cellular module 123, the WiFi module 125, the BT module 127, the GPS module 128, and the NFC module 129 is shown as a separate individual module, at least some of them may be contained in a single integrated circuit (IC) chip or package. For example, at least part of processors each of which corresponds to each of the cellular module 123, the WiFi module 125, the BT module 127, the GPS module 128, and the NFC module 129 (e.g., a communication processor corresponding to the cellular module 123 and a WiFi processor corresponding to the WiFi module 125) may be implemented using a single SoC.

The RF module 121 may be used for transmission and reception of data, e.g., transmission and reception of RF signals. Although not illustrated, the RF module 121 may include, for example, a transceiver, a power amplifier module (PAM), a frequency filter, a low noise amplifier (LNA), and the like. In addition, the RF module 121 may further include a component, e.g., a conductor, a conductive wire, and the like, for transmitting and receiving electromagnetic waves in a free space in a wireless communication. Although FIG. 1 shows that the cellular module 123, the WiFi module 125, the BT module 127, the GPS module 128, and the NFC module 129 share a single RF module 121 with each other, at least one of them may perform transmission and reception of RF signals through a separate RF module.

According to an embodiment of the present disclosure, the SIM card 124_1~N may be a card having SIM and be inserted into the slot 126_1~N formed in a particular portion of the electronic device. The SIM card 124_1~N may have unique identification information (e.g., IC card identifier (ICCID)) or subscriber information (e.g., international mobile subscriber identity (IMSI)). Although not shown, a universal SIM (USIM) which is a combination of the SIM card and a universal IC card (UICC) may be used in WCDMA which is asynchronous 3G mobile communication. The USIM may be designed to perform additional functions as well as a basic function of user authentication. The USIM is an evolved form of SIM and may be inserted into a device or terminal for asynchronous 3G mobile communication (i.e., WCDMA). The USIM may not only perform a function of subscriber authentication offered by SIM, but also have a function of a transportation card or a credit card offered by UICC.

According to an embodiment of the present disclosure, the electronic device 100 may use a USIM card instead of the SIM card 123. In this case, the electronic device may ascertain various kinds of information stored in the USIM card. For example, the USIM card may store therein user identification information, device identification information to be used for performing authentication with a device, and user additional information to be used for performing authentication with the device in a case of a failure in authentication by the device identification information. Based on information stored in the USIM card, the electronic device may ascertain information about a communication operator. However, means for ascertaining such communication operator information are not limited to the USIM card. In an alternative embodiment of the present disclosure, the electronic device using no USIM card may ascertain information about a communication operator by using any other storage area (e.g., the memory) thereof. Using the ascertained information about a communication operator, the electronic device may identify a frequency band that allows a communication through the communication operator.

The interface 130 may include therein a universal serial bus (USB) 131 (e.g., a USB connector) and a high-definition multimedia interface (HDMI) 133. Although not shown, the interface 130 may further include, for example, a mobile high-definition link (MHL) interface, a secure digital (SD) card interface, a multimedia card (MMC) interface, and/or an infrared data association (IrDA) interface. According to an embodiment of this disclosure, the interface 130 may play a role of a radiator of an antenna. For example, having no antenna separately installed, the electronic device 100 may use the interface 130 formed of conductive material as a radiator of an antenna.

The audio module 140 may convert a sound into an electric signal, and vice versa. The audio module 140 may include, for example, a speaker 141 and an earphone 143.

According to an embodiment of the present disclosure, the electronic device 100 may use, as a radiator of an antenna, the audio module 140 as well as the interface 130 discussed above.

According to an embodiment of this disclosure, the current supply module 150 may transmit an electric signal (e.g., an electric current), received from the RF module 121, to at least one of a first power feed terminal 161 and a second power feed terminal 162. For this, the current supply module 150 may include a switch for selectively transmitting an electric signal to at least one of the first power feed terminal 161 and the second power feed terminal 162. The current supply module 150 may be controlled by the control module 110. For example, the control module 110 may recognize the insertion of the SIM card 124 (e.g., the USIM card) and ascertain various kinds of information stored in the SIM card 124. Thereafter, the control module 110 may identify a communication operator based on the ascertained information and also identify an available frequency band of the identified communication operator. As mentioned above, means for ascertaining such communication operators are not limited to the SIM card 124. According to the identified frequency band, the control module 110 may select at least one of the first power feed terminal 161 and the second power feed terminal 162.

The power feed module 160 may include therein the first power feed terminal 161 and the second power feed terminal 162 and transmit an electric signal, received from the current supply module 150, to the connection module 170. The first power feed terminal 161 and the second power feed terminal 162 may receive an electric signal with a dual frequency band. The control module 110 may control the current supply module 150 to select the first power feed terminal 161 or the second power feed terminal 162 depending on a frequency band being used in the electronic device 100.

The connection module 170 may transmit an electric signal, received from the power feed module 160, to the antenna module 180. The connection module 170 may connect the power feed module 160 and the antenna module 180 and also include circuitry for connecting the power feed module 160 and the antenna module 180. This circuitry may be formed of various connection paths for connecting the power feed module 160 and the antenna module 180, and the length of each connection path may be determined based on an available frequency band. For example, the higher the frequency band is, the greater the length of the connection path is. Namely, the resonant frequency of an electric signal may be determined depending on the length of the connection path. For example, the connection module 170 may include the first connection path between the first power feed terminal 161 and a first antenna 181. Additionally, the connection module 170 may include the second connection path between the first power feed terminal 161 and a second antenna 182. The first and second connection paths may be different in length from each other. Therefore, an electric signal flowing along the first connection path and an electric signal flowing along the second connection path have different resonant frequencies. The connection module 170 may have circuitry for connecting the power feed module 160 and the antenna module 180 through various connection paths. The connection module 170 may also play a role of an antenna.

The antenna module 180 is connected with the connection module 170 and may radiate an electric signal received through the connection module 170. The antenna module 180 may include therein the first antenna 181 and the second antenna 182. Each of the first antenna 181 and the second antenna 182 may act as a radiator for radiating a received electric signal. For example, the first antenna 181 may be an antenna for radiating a high frequency band, and the second antenna 182 may be an antenna for radiating a lower frequency band. In an embodiment of this disclosure, the electronic device 100 may use, as radiators, the interface 130, the audio module 140 and the connection module 170 as well as the antenna module 180. For example, in a case of using a metallic device antenna (MDA) antenna, the electronic device 100 may use conductive components (e.g., the USB 131, the speaker 141, the earphone 143) as radiators.

The first antenna 181 and second antenna 182 contained in the antenna module 180 may be formed of an electronic conductor and also may have a slit formed by removing a part of the electric conductor. Here, the slit may be formed to partially cross the electric conductor. Additionally, a power feed line corresponding to the connection module 170 may be formed to cross the slit. Namely, an electric signal received from the power feed module 160 may be delivered to the first antenna 181 or second antenna 182 through the power feed line formed to cross the slit.

Although not shown, the electronic device 100 may further include a matching module configured to match impedance between the power feed module 160 and the antenna module 180. The matching module may include at least one lumped element, which may be a passive device, such as a resistor, an inductor, a capacitor, or any combination thereof.

Each of the above-described elements may be formed of one or more components, and the name of such an element may be varied depending on the type of the electronic device. The electronic device may include at least one of the above-described elements. Some of the above-described elements may be omitted from the electronic device, or the electronic device may further include additional elements. In addition, some of the elements of the electronic device may be combined into one entity, which may perform the same function as those of the elements before combination.

In this disclosure, the term "module" may refer to, for example, a "unit" including one of hardware, software, firmware, and any combination thereof. The term "module" may be interchangeable with other term, such as unit, logic, logical block, component, circuit, and the like. The "module" may be the minimum unit of an integrated component or a part thereof. The "module" may be the minimum unit for performing one or more functions or a part thereof. The "module" may be mechanically or electronically implemented. For example, the "module" may include at least one of an application-specific integrated circuit (ASIC) chip, a field-programmable gate arrays (FPGA), and a programmable-logic device, which are designed to perform a specific operation and have been already known or are to be developed.

Figure 2A:
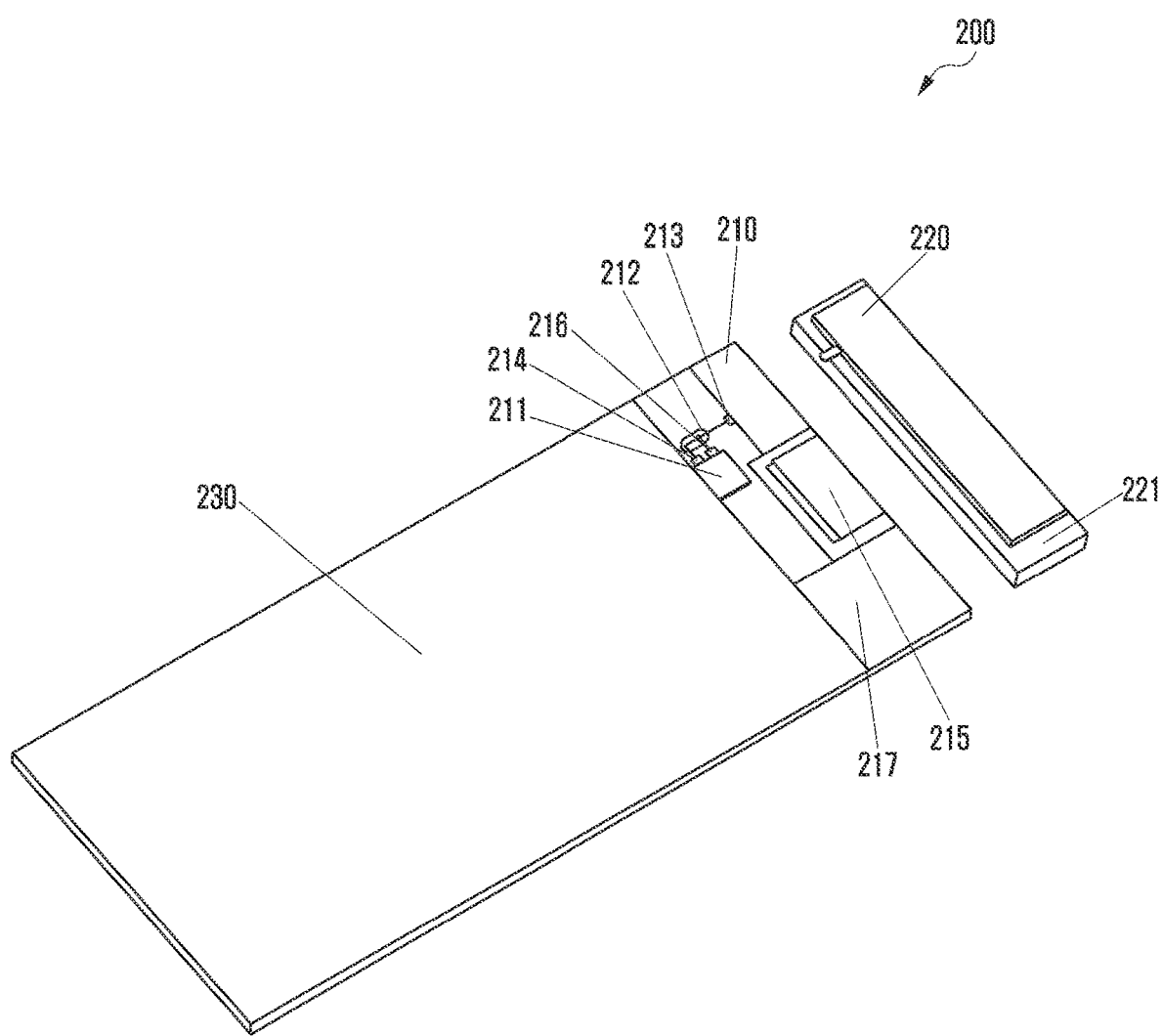
FIG. 2A is a schematic diagram illustrating components of an electronic device according to an embodiment of the present disclosure.

FIG. 2A is a schematic diagram illustrating components of an electronic device according to an embodiment of the present disclosure.

Referring to FIG. 2A, an electronic device 200 may include, for example, a first antenna 210, a second antenna 220, and a printed circuit board (PCB) 230. The first antenna 210 may be the first antenna 181 shown in FIG. 1. The first antenna 210 may be an antenna for using a high frequency band designated in the electronic device 200. The second antenna 220 may be the second antenna 182 shown in FIG. 1. The second antenna 220 may be an antenna for using a low frequency band designated in the electronic device 200.

Table 1 given below shows frequency bands defined in 3rd Generation Partnership Project (3GPP).

TABLE 1

| Band | Uplink (UL) Frequency Band FUL_Low-FUL_High | Downlink (DL) Frequency Band FDL_Low-FDL_High |
|---|---|---|
| 1 | 1920 MHz-1980 MHz | 2110 MHz-2170 MHz |
| 2 | 1850 MHz-1910 MHz | 1930 MHz-1990 MHz |
| 3 | 1710 MHz-1785 MHz | 1805 MHz-1880 MHz |
| 4 | 1710 MHz-1755 MHz | 2110 MHz-2155 MHz |
| 5 | 824 MHz-849 MHz | 869 MHz-894 MHz |
| 6 | 830 MHz-840 MHz | 875 MHz-885 MHz |
| 7 | 2500 MHz-2570 MHz | 2620 MHz-2690 MHz |
| 8 | 880 MHz-915 MHz | 925 MHz-960 MHz |
| 9 | 1749.9 MHz-1784.9 MHz | 1844.9 MHz-1879.9 MHz |
| 10 | 1710 MHz-1770 MHz | 2110 MHz-2170 MHz |
| 11 | 1427.9 MHz-1447.9 MHz | 1475.9 MHz-1495.9 MHz |
| 12 | 698 MHz-716 MHz | 728 MHz-746 MHz |
| 13 | 777 MHz-787 MHz | 746 MHz-756 MHz |
| 14 | 788 MHz-798 MHz | 758 MHz-768 MHz |
| 17 | 704 MHz-716 MHz | 734 MHz-746 MHz |
| 18 | 815 MHz-830 MHz | 860 MHz-875 MHz |
| 19 | 830 MHz-845 MHz | 875 MHz-890 MHz |
| 20 | 832 MHz-862 MHz | 791 MHz-821 MHz |
| 21 | 1447.9 MHz-1462.9 MHz | 1495.9 MHz-1510.9 MHz |

In an embodiment of the present disclosure, the electronic device 200 may classify frequency bands into a low frequency band and a high frequency band in order to implement a multi-carrier and a CA function. For example, a low frequency band may be a group of frequency bands designated as a low frequency band among communication related frequency bands. Specifically, a low frequency band may be band5 (downlink 869~894 MHz), band8 (downlink 925~960 MHz), band17 (downlink 734~746 MHz), band20 (downlink 791~821 MHz), and the like. In addition, a high frequency band may be a group of frequency bands designated as a high frequency band among communication related frequency bands. Specifically, a high frequency band may be band1 (downlink 1920~1980 MHz), band2 (downlink 1850~1910 MHz), band3 (downlink 1710~1785 MHz), band7 (downlink 2500~2570 MHz), band38 (downlink 2570~2620 MHz), band40 (2300~2400 MHz), and the like. In an embodiment of the present disclosure, the electronic device 200 may communicate at two frequency bands using the first antenna 210 and the second antenna 220. The PCB 230 may be a circuitry board or substrate that includes therein and/or thereon circuits and/or components designed to enable the electronic device 200 to communicate.

According to an embodiment of the present disclosure, the first antenna 210 may be formed of a flexible PCB (FPCB), and this FPCB antenna may be an MDA capable of communication by utilizing, as a radiator, a metallic element (e.g., a conductor) embedded in the electronic device. Namely, the first antenna 210 may include various types of metallic elements, for example, a USB connector 215 (i.e., the USB 131 in FIG. 1), a speaker 217 (i.e., the speaker 141 in FIG. 1), a motor (not shown), and the like. The first antenna 210 may be formed of one or more components of the electronic device 200, and such components may be formed of conductive material and thus used as radiators. The electronic device 200 may communicate with an external device by utilizing at least one component formed of conductive material as an antenna without adding antenna components. For example, the first antenna 210 may include a slit formed by removing a part of the electric conductor. Here, the slit may be formed to partially cross the electronic conductor. Additionally, the slit may be formed as a structure in which the power feed line crosses the slit. Here, the slit may be a line that is connected with the first power feed terminal 161 or second power feed terminal 162 of the power feed module 160 and transmits an electric signal to the first antenna 210. The electric conductor will be described in detail in FIG. 2B.

According to an embodiment of the present disclosure, the second antenna 220 may be formed together with an antenna carrier 221. The second antenna 220 may receive and radiate an electric signal of a low frequency band. In addition, the second antenna 220 may receive an electric signal of a low frequency band from a second antenna coupling part 213. The second antenna 220 and the second antenna coupling part 213 may be connected with each other over wires or by wireless. Using the second antenna 220, the electronic device 200 may communicate at a low frequency band of a dual frequency band.

According to an embodiment of the present disclosure, a switch 211 may be included in the current supply module 150 shown in FIG. 1. The switch 211 may select one of a first power feed terminal 214 (e.g., the first power feed terminal 161 in FIG. 1) and a second power feed terminal 216 (e.g., the second power feed terminal 162 in FIG. 1). The electronic device 200 may control the switch 211 such that an electric signal can be transmitted through the first power feed terminal 214 or the second power feed terminal 216. The electronic device 200 may identify a communication operator in use and control the switch 211 to select a power feed terminal corresponding to a frequency band offered by the communication operator.

According to an embodiment of the present disclosure, a connection path 212 may be included in the connection module 170 shown in FIG. 1. For example, the connection path 212 may be an electric signal flow path for connecting the first power feed terminal 214 or the second power feed terminal 216 to the second antenna coupling part 213. In addition, the connection path 212 may be an electric signal flow path for connecting the first power feed terminal 214 or the second power feed terminal 216 to the first antenna 210. Although illustrated in FIG. 2A, the connection path 212 may be configured in various forms corresponding to frequency bands. Namely, various connection paths 212 form circuitry included in the connection module 170. In an embodiment of the present disclosure, the electronic device 200 may determine a resonant frequency of an electric signal by adjusting the length of a path included in the connection path 212. For example, the length of a path corresponding to a high frequency band may be greater than the length of a path corresponding to a low frequency band. If two path lengths are substantially identical to each other, meaning the same length within a given margin of error, resonant frequencies obtained by such paths may be substantially identical to each other. Here, the margin of error may be a particular numeric value measured in advance. Even though there is a difference in length within the margin of error, the electronic device 200 may communicate through the same frequency band. In an embodiment of the present disclosure, by adjusting the length of the connection path 212, the electronic device 200 may output an electric signal of a resonant frequency corresponding to a desired frequency band.

According to an embodiment of the present disclosure, the second antenna coupling part 213 may allow an electric signal, received through the connection path 212, to be transmitted to the second antenna 220. The second antenna coupling part 213 and the second antenna 220 may be connected with each other over wires or by wireless.

According to an embodiment of the present disclosure, the USB connector 215 and the speaker 217, parts of components of the electronic device 200, may be formed of conductive material, e.g., metal. The electronic device 200 may utilize, as the first antenna 210, conductive material connected with the first antenna 210, such as the USB connector 215 and the speaker 217. For example, the first antenna 210 which is MDA may radiate an electric signal by utilizing the USB connector 215 and the speaker 217 as radiators.

The electronic device that implements a method for operating an antenna according to an embodiment of this disclosure may include a power feed module including a first power feed terminal and a second power feed terminal, a current supply module configured to select one of the first power feed terminal and the second power feed terminal and to supply an electric current to the selected power feed terminal, an antenna module including a first antenna and a second antenna, a connection module configured to connect the power feed module and the antenna module, and a control module configured to control the current supply module. Herein, the connection module includes a plurality of wirings. These wirings are disposed such that a first path of the current from the first power feed terminal to the first antenna and a second path of the current from the second power feed terminal to the first antenna have substantially the same length, meaning the same length within a given margin of error. In addition, these wirings are disposed such that a third path of the current from the first power feed terminal to the second antenna and a fourth path of the current from the second power feed terminal to the second antenna have different lengths.

In the electronic device, the connection module may include a first wiring connecting the second power feed terminal and the second antenna, a third wiring connected with the second antenna at one end thereof, a fourth wiring connecting the other end of the third wiring and the first antenna, and a second wiring connecting the first power feed terminal and the fourth wiring. In this case, the first path is formed of the second wiring and the fourth wiring, the second path is formed of the first wiring, the third wiring and the fourth wiring, the third path is formed of the second wiring and the third wiring, and the fourth path is formed of the first wiring.

In the electronic device, the control module may be further configured to ascertain information about a communication operator through a USIM card, to identify a frequency band offered by the communication operator based on the ascertained information, and to control the current supply module based on the identified frequency band.

In the electronic device, the control module may be further configured to ascertain the USIM card inserted in a slot and to ascertain the communication operator information based on information stored in the USIM card.

In the electronic device, if the USIM card is changed, the control module may be further configured to ascertain the communication operator information based on information stored in the changed USIM card.

In the electronic device, if the USIM card is multiple SIM cards, the control module may be further configured to select the USIM card through switching and to ascertain the selected USIM card.

In the electronic device, if the communication operator information is stored in a memory, the control module may be further configured to ascertain the communication operator information stored in the memory.

In the electronic device, the current supply module further may include a switch for selecting at least one of the power feed terminals, and the control module may be further configured control the switch to select at least one of the power feed terminals.

In the electronic device, if the current supply module selects the first power feed terminal from among the power feed terminals, the current supply module may be further configured to supply the current from the first power feed terminal to the first antenna through the first path or to supply the current from the first power feed terminal to the second antenna through the third path.

In the electronic device, if the current supply module selects the second power feed terminal from among the power feed terminals, the current supply module may be further configured to supply the current from the second power feed terminal to the first antenna through the second path or to supply the current from the second power feed terminal to the second antenna through the fourth path.

Figure 2B:
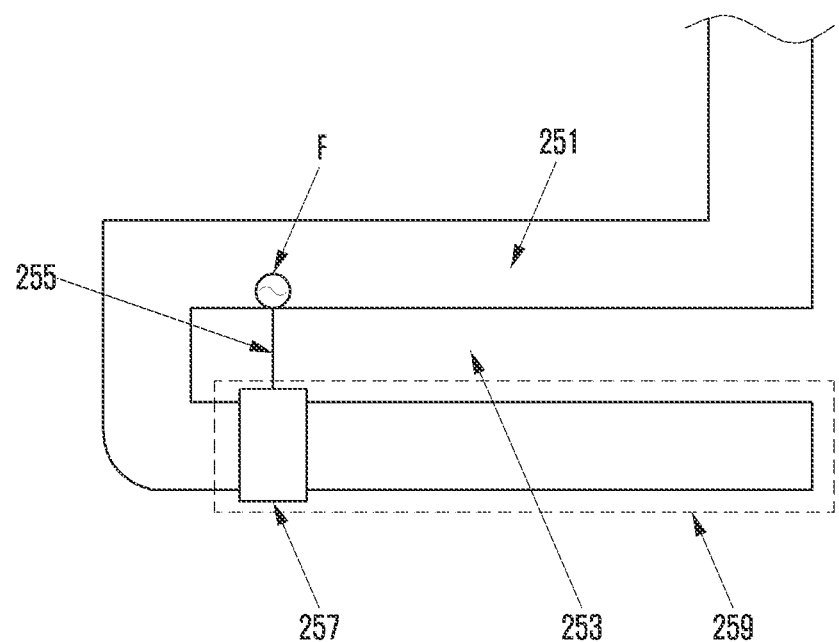
FIG. 2B is a schematic diagram illustrating an electric conductor embedded in an electronic device according to an embodiment of the present disclosure.

FIG. 2B is a schematic diagram illustrating an electric conductor embedded in an electronic device according to an embodiment of the present disclosure.

Referring to FIG. 2B, shown is an example of an electric conductor 251 embedded in the electronic device 200. The electric conductor 251 may be formed variously and not limited to the structure shown in FIG. 2B. The electric conductor 251 may be formed of conductive material and play a role of a radiator by being connected with the first and second antennas 210 and 220. The electric conductor 251 may be partially removed to form a slit 253. Here, the slit 253 may be formed to partially cross the electric conductor 251. Additionally, the electric conductor 251 may include a power feed part F, which may be connected with an interface connector 257 through a power feed line 255. Here, the power feed part F may receive an electric signal by being connected with a power feed module (e.g., the power feed module 160 in FIG. 1) of the electronic device 200 and also transmit the electric signal to the power feed line 255. The electronic device 200 according to various embodiments of the present disclosure may utilize, as a radiator 259 (e.g., the first antenna 210), a part of the electric conductor 251 extended to the right from the interface connector 257. The electronic device 200 according to various embodiments of the present disclosure may transmit an electric signal from the power feed module 160 to the power feed part F and also transmit the electric signal by utilizing the electric conductor 251 having the power feed part F.

Figure 3:
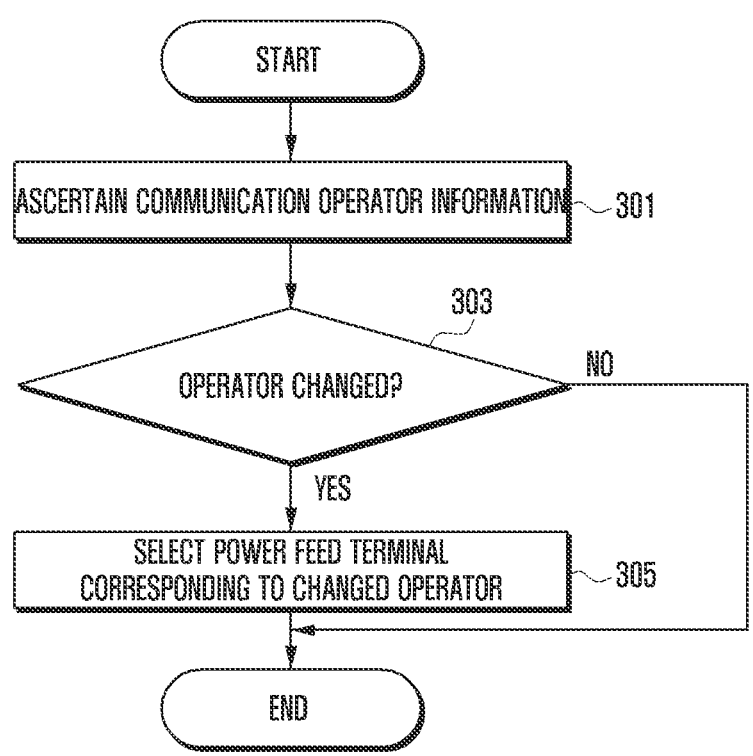
FIG. 3 is a flowchart illustrating a method for operating an antenna device according to an embodiment of the present disclosure.

FIG. 3 is a flowchart illustrating a method for operating an antenna according to an embodiment of the present disclosure.

Referring to FIG. 3, at operation 301, the control module 110 of the electronic device 100 may ascertain information about a communication operator in use. For example, the control module 110 may ascertain the SIM card 124_1~N (e.g., the USIM card) connected with the slot 126_1~N. The SIM card may be multiple SIM cards. The control module 110 may ascertain information about a communication operator in use, based on information stored in the SIM card 124 (e.g., the USIM card). This information stored in the SIM card 124 may be user identification information, device identification information to be used for performing authentication with a device, and user additional information to be used for performing authentication with the device in a case of a failure in authentication by the device identification information. Based on the ascertained information about a communication operator, the control module 110 may identify a frequency band offered by the communication opera-tor. Although the communication operator information is ascertained through the SIM card 124 in an embodiment of the present disclosure, such ascertainment may not be limited to the SIM card 124. For example, communication operator information may be stored in any storage space (e.g., the memory) without the SIM card 124. Namely, the electronic device 100 may ascertain communication operator information in various manners.

At operation 303, the control module 110 of the electronic device 100 may determine whether a communication operator in use is changed. For example, in a case of roaming, a communication operator may be changed. In a case of using multiple SIM cards, the electronic device 100 may change a SIM card in a switching manner, and a communication operator may be changed accordingly. A change in communication operators may have the same meaning as a change in frequency bands.

If it is determined at operation 303 that a communication operator is changed, the control module 110 of the electronic device 100 may select a power feed terminal in response to a specific frequency band offered by the changed communication operator at operation 305. For example, the control module 110 of the electronic device 100 may control the current supply module 150 to select at least one of the first power feed terminal 161 and the second power feed terminal 162 in response to the frequency band. More particularly, the electronic device 100 may be fabricated to have in advance connection paths corresponding to the respective frequency bands to be offered by a communication operator and thereby to transmit an electric signal through the first or second power feed terminal 161 or 162.

For example, in a case where a communication operator is the communication operator A, the electronic device 100 may select the first power feed terminal 161 by controlling the current supply module 150. Thereafter, the electronic device 100 may radiate an electric signal with a resonant frequency resulting from a connection path connected with the first power feed terminal 161. If a communication operator in use is changed from the communication operator A to the communication operator B, the electronic device 100 may control the current supply module 150 to change a selection from the first power feed terminal 161 to the second power feed terminal 162. Thereafter, the electronic device 100 may radiate an electric signal with a resonant frequency resulting from a connection path connected with the second power feed terminal 162. In an embodiment of the present disclosure, the electronic device 100 may select a power feed terminal depending on the type of a communication operator. Connection paths connected with power feed terminals may have different lengths corresponding to frequency bands offered by each communication operator.

For example, the communication operator A may offer a service band3 (i.e., a high frequency band) and band5 (i.e., a low frequency band) as available frequency bands. The connection module 170 of the electronic device 100 may have in advance connection paths respectively corresponding to band3 and band5 offered by the communication operator A. These connection paths may be connected with the first power feed terminal 161. If the electronic device 100 uses the communication operator A, the control module 110 of the electronic device 100 may control the current supply module 150 to select the first power feed terminal 161. Then, based on the connection paths connected with the first power feed terminal 161, the control module 110 may use frequency bands corresponding to band3 and band5. Additionally, the communication operator B may offer band3 (i.e., a high frequency band) and band8 (i.e., a low frequency band) as available frequency bands. The connection module 170 of the electronic device 100 may have in advance connection paths respectively corresponding to band3 and band8 offered by the communication operator B. In this case, connection paths corresponding to band3 respectively offered by the communication operators A and B may be formed with substantially the same length or similar lengths, meaning the same length within a given margin of error. Connection paths corresponding to the communication operator B may be connected with the second power feed terminal 162. If the electronic device 100 changes from the communication operator A to the communication operator B, the control module 110 of the electronic device 100 may control the current supply module 150 to select the second power feed terminal 162. Then, based on the connection paths connected with the second power feed terminal 162, the control module 110 may use frequency bands corresponding to band3 and band8. This method according to an embodiment may maintain a radiation performance even though an available frequency band is changed from one communication operator (e.g., the operator A) to the other (e.g., the operator B).

FIGS. 4A, 4B, 4C, 4D, and 4E are schematic diagrams illustrating different signal paths depending on frequency bands according to various embodiments of the present disclosure.

Referring to FIG. 4A, the electronic device 100 may include a switch 410 (the switch 211 in FIG. 2A), a first power feed terminal 411 (the first power feed terminal 214 in FIG. 2A), a second power feed terminal 413 (the second power feed terminal 216 in FIG. 2A), a second antenna coupling part 420 (the second antenna coupling part 213 in FIG. 2A), and a first antenna 430 (the first antenna 210 in FIG. 2A). FIG. 4A provides illustration regarding the current supply module 150, the power feed module 160, the connection module 170 and the antenna module 180, which are shown in FIG. 1. The function of each element shown in FIG. 4A is previously discussed in FIG. 2A.

Figure 4B:
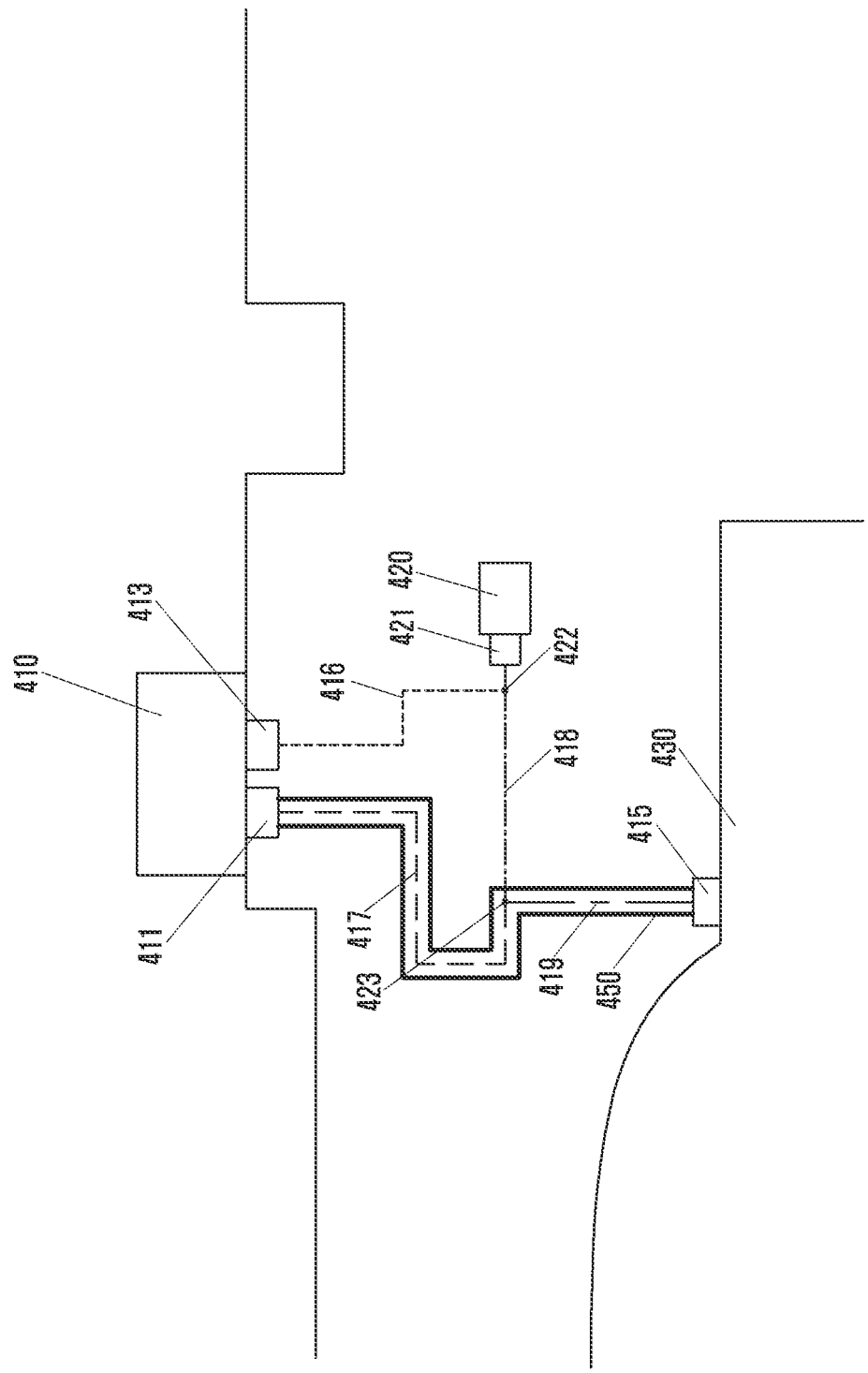

In an embodiment of the present disclosure, the electronic device 100 may determine a resonant frequency of an electric signal in response to the length of a connection path. Referring to FIG. 4A, a first wiring 416 may be a path between the second power feed terminal 413 and a second antenna coupling part terminal 421. Specifically, the first wiring 416 may be wiring having a length from the second power feed terminal 413 to a first contact 422. A third wiring 418 may be wiring having a length from the first contact 422 to a second contact 423. A fourth wiring 419 may be wiring having a length from the second contact 423 to a first antenna terminal 415. A second wiring 417 may be wiring having a length from the first power feed terminal 411 to the second contact 423. Flow paths of an electric signal will be described below in FIGS. 4B, 4C, 4D and 4E.

FIGS. 4B and 4C illustrate flow paths of an electric signal when the electronic device communicates using frequency bands offered by the communication operator A.

Referring to FIG. 4B, a flow path A 450 of an electric signal in a case where the electronic device 100 communicates at a high frequency band of two frequency bands offered by the communication operator A is illustrated. For example, the communication operator A may offer two frequency bands, band3 (a high frequency band) and band8 (a low frequency band). The electronic device 100 may identify the communication operator A and control the switch 410 to select the first power feed terminal 411 corresponding to the frequency band offered by the communication operator A. In a case of a communication using band3, the electronic device 100 may transmit an electric signal through the flow path A 450. This flow path A 450 may include the second wiring 417 and the fourth wiring 419. A resonant frequency of an electric signal may be determined based on the length of a flow path. Therefore, the flow path A 450 may have a length for obtaining a resonant frequency available for band3.

Referring to FIG. 4C, a flow path B 460 of an electric signal in a case where the electronic device 100 communicates at a low frequency band of two frequency bands offered by the communication operator A is illustrated. For example, the communication operator A may offer two frequency bands, band3 (a high frequency band) and band8 (a low frequency band). The electronic device 100 may identify the communication operator A and control the switch 410 to select the first power feed terminal 411 corresponding to the frequency band offered by the communication operator A. In a case of a communication using band8, the electronic device 100 may transmit an electric signal through the flow path B 460. This flow path B 460 may include the second wiring 417 and the third wiring 418. The flow path B 460 may have a length for obtaining a resonant frequency available for band8.

FIGS. 4D and 4E illustrate flow paths of an electric signal when the electronic device communicates using frequency bands offered by the communication operator B.

Referring to FIG. 4D, a flow path C 470 of an electric signal in a case where the electronic device 100 communicates at a high frequency band of two frequency bands offered by the communication operator B is illustrated. For example, the communication operator B may offer two frequency bands, band3 (a high frequency band) and band5 (a low frequency band). The electronic device 100 may identify the communication operator B and control the switch 410 to select the second power feed terminal 413 corresponding to the frequency band offered by the communication operator B. In a case of a communication using band3, the electronic device 100 may transmit an electric signal through the flow path C 470. This flow path C 470 may include the first wiring 416, the third wiring 418 and the fourth wiring 419. A resonant frequency of an electric signal may be determined based on the length of a flow path. Therefore, the flow path C 470 may have a length for obtaining a resonant frequency available for band3. The flow path A 450 shown in FIG. 4B and the flow path C 470 are flow paths having a length capable of obtaining a resonant frequency available for band3. Namely, the flow path A 450 and the flow path C 470 may have substantially the same length or similar lengths, meaning the same length within a given margin of error, just starting from different power feed terminals. The length of the second wiring 417 is substantially identical or similar to the total length of the first wiring 416 and the third wiring 418, meaning the same or similar within a given margin of error. The electronic device according to an embodiment can maintain a radiation performance for the same frequency band even though the communication operator is changed.

Referring to FIG. 4E, a flow path D 480 of an electric signal in a case where the electronic device 100 communicates at a low frequency band of two frequency bands offered by the communication operator B is illustrated. For example, the communication operator B may offer two frequency bands, band3 (a high frequency band) and band5 (a low frequency band). The electronic device 100 may identify the communication operator B and control the switch 410 to select the second power feed terminal 413 corresponding to the frequency band offered by the communication operator B. In a case of a communication using band5, the electronic device 100 may transmit an electric signal through the flow path D 480. This flow path D 480 may include the first wiring 416. The flow path D 480 may have a length for obtaining a resonant frequency available for band5.

The electronic device 100 according to an embodiment of the present disclosure can maintain a radiation performance of an electric signal even though the communication operator is changed. FIGS. 4B and 4C illustrate flow paths of an electric signal in a case of using frequency bands offered by the communication operator A, and FIGS. 4D and 4E illustrate flow paths of an electric signal in a case of using frequency bands offered by the communication operator B. The electronic device 100 may transmit an electric signal through the flow path A 450 or the flow path B 460 in a case of using a frequency band of the communication operator A and also transmit an electric signal through the flow path C 470 or the flow path D 480 in a case of using a frequency band of the communication operator B. Some of frequency bands offered by the communication operators A and B may be the same frequency band. The electronic device 100 may change a resonant frequency by adjusting the length of a flow path and thereby change an available frequency band. The flow path A 450 and the flow path C 470 may have substantially the same length, meaning the same length within a given margin of error. Namely, if a communication operator is changed from the communication operator A to the communication operator B, the electronic device 100 may change the flow path A 450 to the flow path C 470 so as to maintain the same radiation performance at the same frequency band. In an embodiment of the present disclosure, even though a communication operator is changed, the electronic device 100 may not only keep a communication of unchanged frequency band but also perform a communication of changed frequency band.

Figure 5:
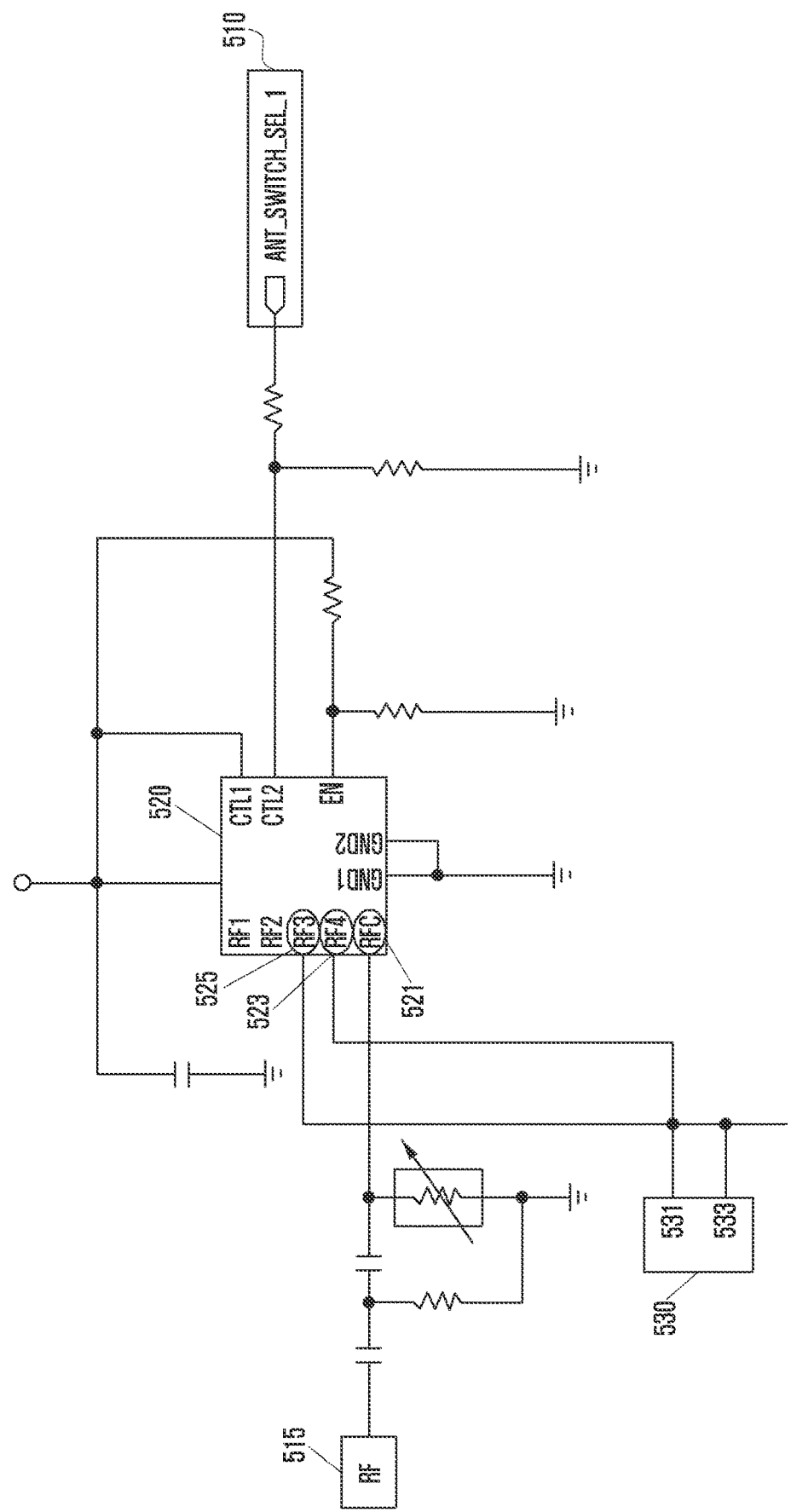
FIG. 5 is a diagram illustrating a circuitry device according to an embodiment of the present disclosure.

FIG. 5 is a diagram illustrating a circuitry device according to an embodiment of the present disclosure.

Referring to FIG. 5, in the form of circuitry, the current supply module 150, the power feed module 160, the connection module 170 and the antenna module all of which are shown in FIG. 1 are illustrated. The control module 110 may determine whether to transmit a switch selection signal (ANT_SWITCH_SEL_1) and control the operation of a switch 520 (e.g., the switch 211 in FIG. 2A). By controlling the switch 520, the control module 110 may determine a power feed terminal (e.g., an RF3 525 and an RF4 523) of an electric signal. The power feed terminals, RF3 525 and RF4 523, may be the first power feed terminal 161 and the second power feed terminal 152, respectively, shown in FIG. 1. The control module 110 may control the communication module 120 to transmit an electric signal from an RF module 515 (e.g., the RF module 121 in FIG. 1) to an RFC terminal 521 of the switch 520. The control module 110 may identify a specific communication operator based on communication operator information stored in the SIM card and transmit a switch selection signal 510 to the switch 520 to determine a power feed terminal corresponding to the identified communication operator. Thereafter, the switch 520 may determine a power feed terminal based on the antenna switch selection signal 510 and transmit an electric signal, received through the RFC terminal 521, to the determined power feed terminal.

For example, if the RF3 525 is determined as a power feed terminal, an electric signal may be transmitted to a second antenna coupling part 530 (i.e., the second antenna coupling part 213) and the first antenna (not shown). The second antenna coupling part 530 may be included in the antenna module 180 shown in FIG. 1. In addition, a flow path from the RF3 525 to the second antenna coupling part 530 may be included in the connection module 170 shown in FIG. 1. Meanwhile, the length of a flow path from a power feed terminal (e.g., the RF3 525 the RF4 523) to the second antenna coupling part 530 may be determined based on a frequency band offered by a communication operator. The second antenna coupling part 530 may include a transmission terminal 531 and a reception terminal 533.

Figure 6:
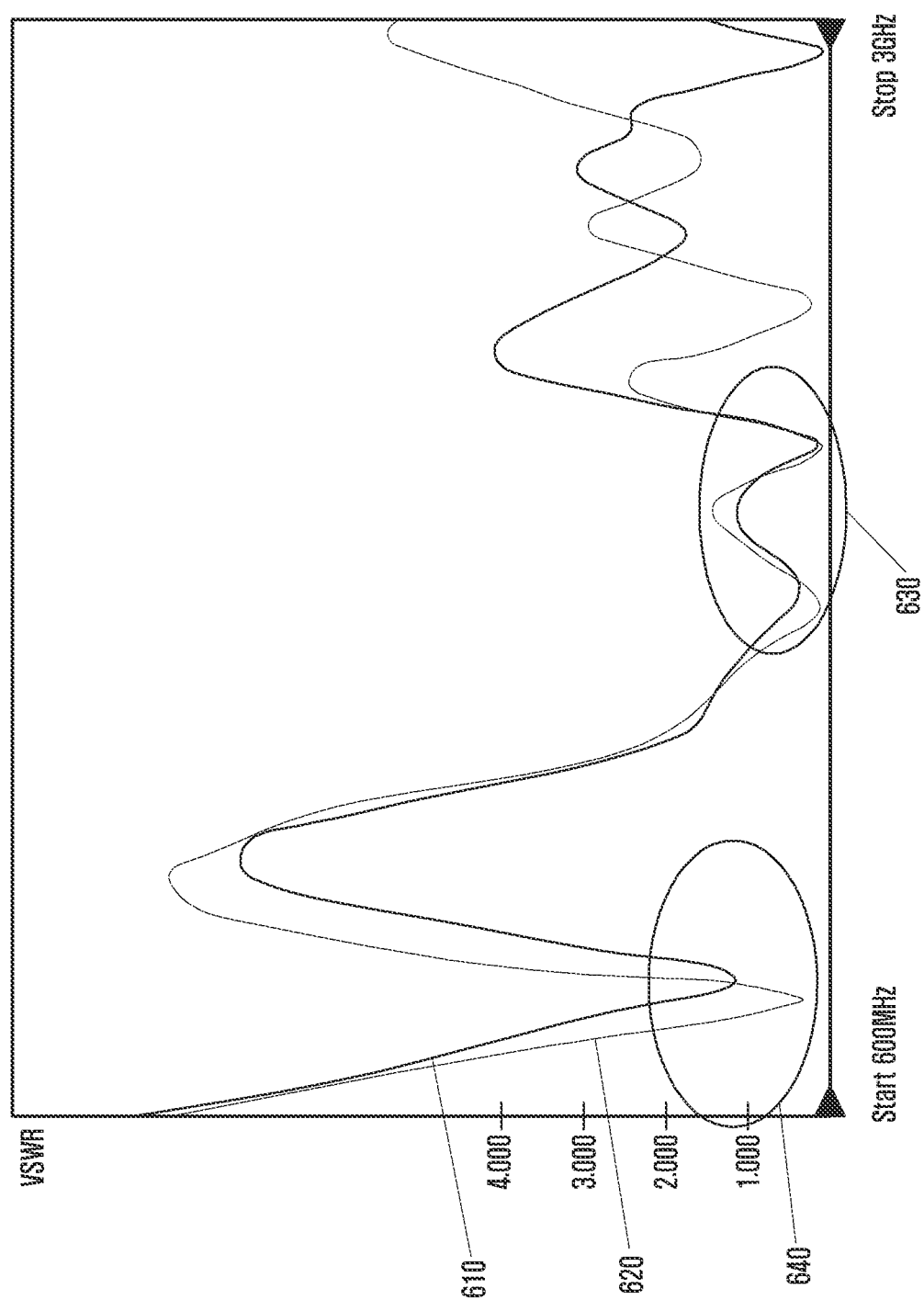
FIG. 6 is a graph illustrating a radiation performance of a changed frequency band device according to an embodiment of the present disclosure.

FIG. 6 is a graph illustrating a radiation performance of a changed frequency band according to an embodiment of the present disclosure.

Referring to FIG. 6, the graph of FIG. 6 represents a voltage standing wave ratio (VSWR) 610 (hereinafter, referred to as VSWR A) of a signal transmitted by the electronic device 100 at a frequency band offered by the communication operator A, and a voltage standing wave ratio (VSWR) 620 (hereinafter, referred to as VSWR B) of a signal transmitted by the electronic device 100 at a frequency band offered by the communication operator B. VSWR is an index for indicating the quantity of reflection of energy inputted in a circuit or system. For example, the voltage and current on a line having reflection may depend on a composite wave of an incident wave and a reflected wave. The maximum and minimum values of the voltage and current may be obtained at certain points on a line due to an incident wave and a reflected wave. Such a radio wave is a standing wave. VSWR is the ratio of the maximum value to the minimum value of a standing wave on a line and indicates how large a standing wave is. Since a standing wave is proportional to the quantity of reflection, VSWR may be used as another index that indicates the quantity of reflection at an input terminal of a circuit. VSWR may be obtained using the following equation: VSWR=(1+reflection coefficient)/(1−reflection coefficient). Namely, VSWR may be the quantity of reflection with regard to an incident wave. The optimum condition is that VSWR is one. This indicates a state of no reflected wave. In a case where VSWR is two, the rate of wave loss is 11%. Namely, the output radiated through an antenna is about 89%. VSWR may be used for determining a radiation performance of waves.

Referring to FIG. 6, a user can determine a variation of radiation performance resulting from a change in frequency bands, for example, through the VSWR A 610 of the communication operator A using band3 and band8 and the VSWR B 620 of the communication operator B using band3 and band5. In a case of changing from the communication operator A to the communication operator B, the method according to an embodiment of this disclosure may allow the electronic device 100 to secure the radiation performance of band5 (i.e., a low frequency band) while keeping the radiation performance of band3 (i.e., a high frequency band). A user can compare the radiation performance of a high frequency band (e.g., band3) at a first comparison region 630 in FIG. 6. As shown, the VSWR A 610 and the VSWR B 620 are almost the same at the first comparison region 630. Namely, although the communication operator A is changed to the communication operator B, the electronic device 100 can maintain the radiation performance of a high frequency band. Additionally, a user can compare the radiation performance of a low frequency band (e.g., band5) at a second comparison region 640. As also shown, the VSWR A 610 and the VSWR B 620 are almost the same at the second comparison region 640. Namely, although the communication operator A is changed to the communication operator B, the electronic device 100 can maintain the radiation performance of a low frequency band.

As discussed above, even though communication operators are changed, the method according to an embodiment of this disclosure may allow the electronic device 100 to secure the radiation performance of a non-overlapped frequency band as well as the radiation performance of an overlapped frequency band among at least two frequency bands in use.

Table 2 given below shows total radiated power (TRP) and total isotropic sensitivity (TIS) in a case where communication operators are changed. In Table 2, TRP indicates the total power radiated by an antenna regardless of direction or polarity. Namely, TRP is a measured value of transmission performance of the electronic device. Meanwhile, TIS is a measure value of reception performance of the electronic device.

TABLE 2

|  | Band5 | | Band8 | | Band3 | | Band1 | |
| --- | --- | --- | --- | --- | --- | --- | --- | --- |
|  | TRP [watt] | TIS | TRP | TIS | TRP | TIS | TRP | TIS |
| Target | 17.5 | −86.5 | 26 | −102 | 18 | −90 | 19.0 | −90 |
| H final mass production level | 18.0 | −88.3 | 25.4 | −100.6 | 18.3 | −88.8 | 19.0 | −92.0 |
| B5 switching (USIM conditions of operator B) | 18.0 | −88.1 | 27.2 | −100.2 | 21.1 | −89.0 | 18.8 | −91.5 |
| B8 switching (USIM conditions of operator A) | 16.5 | −87.4 | 28.0 | −103.1 | 20.9 | −89.3 | 19.9 | −92.0 |

Referring to Table 2, in a case where the communication operator B (service frequency bands: band3, band5) is changed to the communication operator A (service frequency bands: band3, band8), TRP and TIS are not nearly varied at the overlapped frequency band (i.e., band3). As mentioned above, TRP and TIS may be measured numeric values that indicate respectively transmission performance and reception performance at each frequency band. From such TRP and TIS, a user can determine transmission performance and reception performance at each frequency band.

The method for operating an antenna according to an embodiment of this disclosure may include controlling a current supply module to supply an electric current to one of a first power feed terminal and a second power feed terminal. In this method, an antenna module includes a first antenna and a second antenna, and a connection module connects the current supply module and the antenna module and includes a plurality of wirings. The wirings are disposed such that a first path of the current from the first power feed terminal to the first antenna and a second path of the current from the second power feed terminal to the first antenna have the substantially the same length, meaning same length within a given margin of error, and also disposed such that a third path of the current from the first power feed terminal to the second antenna and a fourth path of the current from the second power feed terminal to the second antenna have different lengths.

In the method for operating an antenna, the connection module may include a first wiring connecting the second power feed terminal and the second antenna, a third wiring connected with the second antenna at one end thereof, a fourth wiring connecting the other end of the third wiring and the first antenna, and a second wiring connecting the first power feed terminal and the fourth wiring. In this case, the first path is formed of the second wiring and the fourth wiring, the second path is formed of the first wiring, the third wiring and the fourth wiring, the third path is formed of the second wiring and the third wiring, and the fourth path is formed of the first wiring.

In the method for operating an antenna, the controlling of the current supply module may include ascertaining information about a communication operator through a USIM card, identifying a frequency band offered by the communication operator based on the ascertained information, and controlling the current supply module based on the identified frequency band.

In the method for operating an antenna, the ascertaining of the communication operator information may include ascertaining the USIM card inserted in a slot, and ascertaining the communication operator information based on information stored in the USIM card.

In the method for operating an antenna, the ascertaining of the communication operator information may include, if the USIM card is changed, ascertaining the communication operator information based on information stored in the changed USIM card.

In the method for operating an antenna, the ascertaining of the communication operator information may include, if the USIM card is multiple SIM cards, selecting the USIM card through switching, and ascertaining the communication operator information through the selected USIM card.

In the method for operating an antenna, the controlling of the current supply module may include, if the communication operator information is stored in a memory, ascertaining the communication operator information stored in the memory, identifying a frequency band offered by the communication operator based on the ascertained information, and controlling the current supply module based on the identified frequency band.

In the method for operating an antenna, the controlling of the current supply module may include controlling a switch included in the current supply module to select one of the first power feed terminal and the second power feed terminal, and controlling the current supply module to supply the current to the selected power feed terminal.

As fully described hereinbefore, the electronic device and method according to various embodiments of this disclosure can secure a reliable radiation performance at a changed frequency band without a change in size of the electronic device by using the characteristics of MDA antenna and switch circuit. According to various embodiments of the present disclosure, by utilizing, as radiators, conductive components embedded in the electronic device, no additional space for an antenna is required. Additionally, by selecting a suitable wiring corresponding to information about a communication operator to be used, it is possible to secure a radiation performance regarding an added or changed frequency band without deteriorating a radiation performance regarding a specific frequency band among the existing frequency bands in use. Namely, the electronic device can perform a communication by using a new frequency band offered by any other communication operator as well as the existing frequency band offered by a specific communication operator.

According to various embodiments of the present disclosure, at least some of the devices (e.g., modules or functions thereof) or the methods (e.g., operations) according to the present disclosure may be implemented by a command stored in a non-transitory computer-readable storage medium in a programming module form. When such a command is executed by one or more processors (e.g., the AP 111 in FIG. 1), the processor(s) may perform a particular function corresponding to the command. The non-transitory computer-readable storage medium may be, for example, the memory. At least a part of the programming module may be implemented (e.g., executed) by, for example, the AP 111. At least a part of the programming module may include, for example, a module, a program, a routine, a set of instructions, and/or a process for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

In various embodiments of the present disclosure, an existing component of a module or programming module may be removed or a new component may be added to the module or programming module. Operations supported by components of a module or programming module may be carried out in sequence, in parallel, by repetition, or heuristically. In a dynamic manner, some operations may be executed in different order or may be skipped, or a new operation may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
an antenna module including a first antenna and a second antenna;
a power feed module including a first power feed terminal and a second power feed terminal;
a connector module connecting the power feed module and the antenna module;
a current supply module supplying an electric current to at least one of the first power feed terminal and the second power feed terminal; and
at least one processor operatively connected to the current supply module,
wherein the at least one processor is configured to:
identify a wireless communication operator through a universal subscriber identity module (USIM) card,
when the identified wireless communication operator is identified to be a first wireless communication operator, select the first power feed terminal corresponding to a first frequency band serviced by the first wireless communication operator,
when the identified wireless communication operator is identified to be a second wireless communication operator, select the second power feed terminal corresponding to a second frequency band serviced by the second wireless communication operator, and
supply the electric current to the selected one of the first power feed terminal and the second power feed terminal through the current supply module, wherein the connector module includes a plurality of wirings,
wherein the plurality of wirings comprise a first wiring path from the first power feed terminal to the first antenna, a second wiring path from the second power feed terminal to the first antenna, a third wiring path from the first power feed terminal to the second antenna, and a fourth wiring path from the second power feed terminal to the second antenna,
wherein the first wiring path and the second wiring path have substantially the same length for the first antenna, and the third wiring path and the fourth wiring path have a different length for the second antenna,
wherein the length of the third wiring paths is adjusted to change a first resonant frequency based on an available frequency among a plurality of available frequencies offered by the first wireless communication operator, and
wherein the length of the fourth wiring paths is adjusted to change a second resonant frequency based on an available frequency among a plurality of available frequencies offered by the second wireless communication operator.

2. The electronic device of claim 1,
wherein the connector module comprises a first wiring connecting the second power feed terminal and the second antenna, a third wiring connected with the second antenna at one end, a fourth wiring connecting the other end of the third wiring and the first antenna, and a second wiring connecting the first power feed terminal and the fourth wiring, and
wherein the first path is formed of the second wiring and the fourth wiring, the second path is formed of the first wiring, the third wiring and the fourth wiring, the third path is formed of the second wiring and the third wiring, and the fourth path is formed of the first wiring.

3. The electronic device of claim 1,
wherein the at least one processor is further configured to:
ascertain the USIM card inserted in a slot, and
ascertain wireless communication operator information based on information stored in the USIM card, and
wherein, when the USIM card is selectable from multiple USIM cards, the at least one processor is further configured to:
select the USIM card through switching, and
ascertain the wireless communication operator information through the selected USIM card.

4. The electronic device of claim 1, wherein, when wireless communication operator information is stored in a memory, the at least one processor is further configured to ascertain the wireless communication operator information stored in the memory.

5. The electronic device of claim 1,
wherein the current supply module further comprises a switch for selecting at least one of the first power feed terminal or the second power feed terminal, and
wherein the at least one processor is further configured to control the switch to select at least one of the first power feed terminal or the second power feed terminal.

6. The electronic device of claim 1, wherein the at least one processor is further configured to:
when the first power feed terminal is selected through the current supply module, supply the electric current from the first power feed terminal to the first antenna through the first path or to supply the current from the first power feed terminal to the second antenna through the third path.

7. The electronic device of claim 1, wherein the at least one processor is further configured to:
when the second power feed terminal is selected through the current supply module, supply the electric current from the second power feed terminal to the first antenna through the second path, or
supply the electric current from the second power feed terminal to the second antenna through the fourth path.

8. The electronic device of claim 1,
wherein the frequency band comprises one or more frequency bands, and
wherein the USIM card stores user identification information, device identification information, and user additional information.

9. The electronic device of claim 1,
wherein the antenna module is composed of conductive components of the electronic device,
wherein the conductive components include a connector member mounted on a conductive layer disposed on a circuit board of the electronic device, and
wherein the connector member is connected to at least one of the first antenna and the second antenna.

10. The electronic device of claim 9, further comprising a slit formed by partially removing the conductive layer from an area surrounding the connector member.

11. The electronic device of claim 10, further comprising a power feeding line formed across the slit,
wherein the connector member is connected to the first power feed terminal and to the second power feed terminal through the power feeding line.

12. A method for operating an antenna in an electronic device, the method comprising:
identifying a wireless communication operator through a universal subscriber identity module (USIM) card,
when the identified wireless communication operator is identified to be a first wireless communication operator, selecting, by at least one processor, a first power feed terminal of a power feed module corresponding to a first frequency band serviced by the first wireless communication operator,
when the identified wireless communication operator is identified to be a second wireless communication operator, selecting, by at least one processor, a second power feed terminal of the power feed module corresponding to a second frequency band serviced by the second wireless communication operator, and
supplying, by the at least one processor, an electric current to the selected one of the first power feed terminal and the second power feed terminal through a current supply module of the electronic device,
wherein the power feed module connected to an antenna module through a connector module, wherein the antenna module including a first antenna and a second antenna,
wherein the connector module includes a plurality of wirings,
wherein the plurality of wirings comprise a first wiring path from the first power feed terminal to the first antenna, a second wiring path from the second power feed terminal to the first antenna, a third wiring path from the first power feed terminal to the second antenna, and a fourth wiring path from the second power feed terminal to the second antenna,
wherein the first wiring path and the second wiring path have substantially the same length for the first antenna, and the third wiring path and the fourth wiring path have a different length for the second antenna,
wherein the length of the third wiring paths is adjusted to change a first resonant frequency based on an available frequency among a plurality of available frequencies offered by the first wireless communication operator, and
wherein the length of the fourth wiring paths is adjusted to change a second resonant frequency based on an available frequency among a plurality of available frequencies offered by the second wireless communication operator.

13. The method of claim 12,
wherein the connector module comprises a first wiring connecting the second power feed terminal and the second antenna, a third wiring connected with the second antenna at one end, a fourth wiring connecting the other end of the third wiring and the first antenna, and a second wiring connecting the first power feed terminal and the fourth wiring, and
wherein the first path is formed of the second wiring and the fourth wiring, the second path is formed of the first wiring, the third wiring and the fourth wiring, the third path is formed of the second wiring and the third wiring, and the fourth path is formed of the first wiring.

14. The method of claim 12, further comprising:
ascertaining the USIM card inserted in a slot; and
ascertaining the wireless communication operator information based on information stored in the USIM card.

15. The method of claim 12, further comprising:
selecting, when the USIM card is selectable from multiple USIM cards, the USIM card through switching; and
ascertaining the wireless communication operator information through the selected USIM card.

16. The method of claim 12, further comprising:
ascertaining, when the wireless communication operator information is stored in a memory, the wireless communication operator information stored in the memory;

identifying a frequency band offered by the wireless communication operator based on the ascertained information; and controlling the current supply module based on the identified frequency band.

17. The method of claim 12, further comprising:

controlling a switch included in the current supply module to select one of the first power feed terminal and the second power feed terminal; and controlling the current supply module to supply the current to the selected one of the first power feed terminal or the second power feed terminal.

18. At least one non-transitory computer readable storage medium for storing a computer program of instructions configured to be readable by at least one processor for instructing the at least one processor to execute a computer process for performing the method of claim 12.

* * * * *